Nov. 11, 1958 H. M. GEYER 2,859,640
FLUID PRESSURE ACTUATOR WITH UNIDIRECTIONAL
LOCKING MEANS AND MANUAL OVERDRIVE
Filed Dec. 12, 1955 2 Sheets-Sheet 1
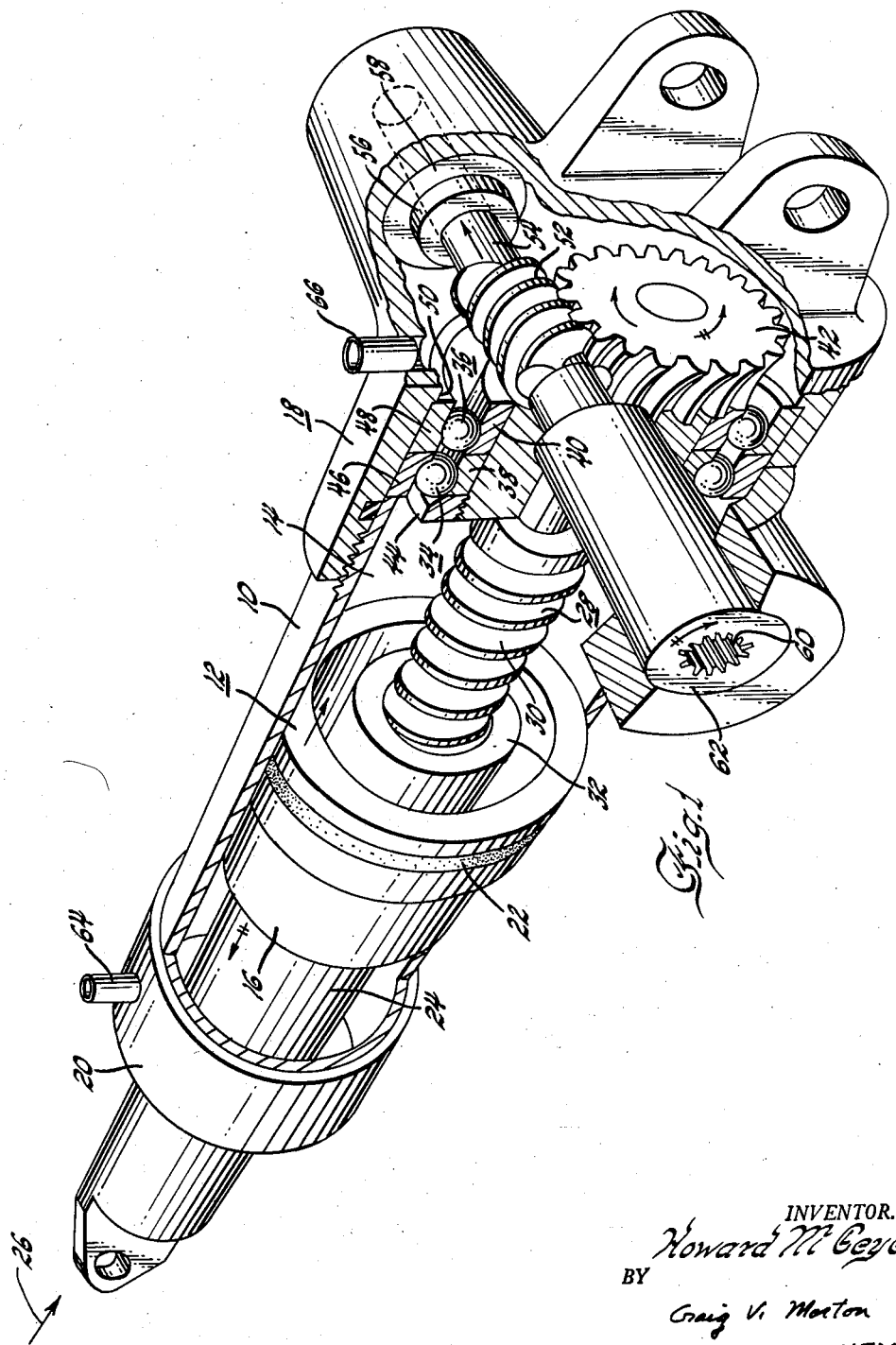
INVENTOR.
Howard M. Geyer
BY
Craig V. Morton
HIS ATTORNEY

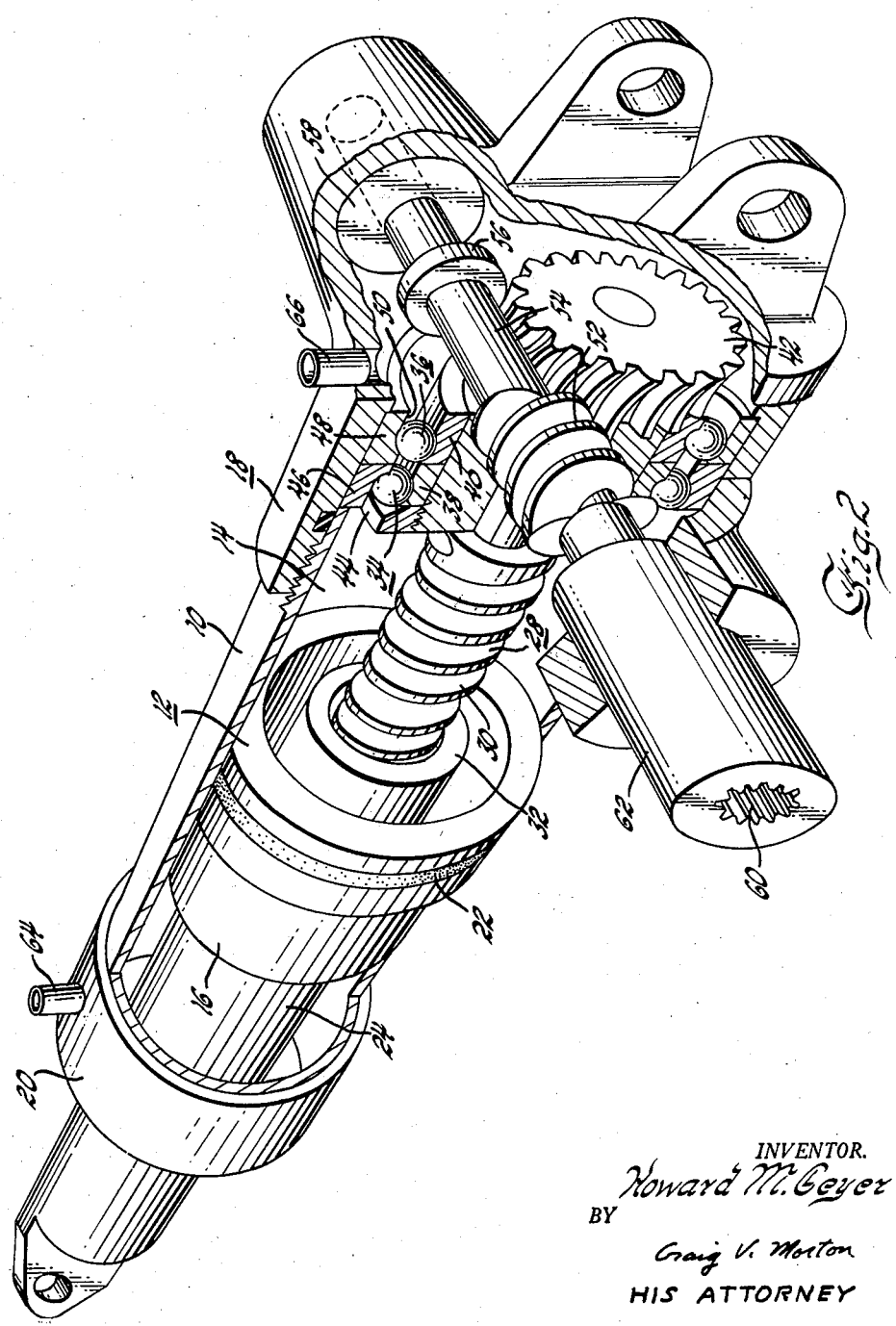

United States Patent Office 2,859,640
Patented Nov. 11, 1958

2,859,640

FLUID PRESSURE ACTUATOR WITH UNIDIRECTIONAL LOCKING MEANS AND MANUAL OVERDRIVE

Howard M. Geyer, Dayton, Ohio, assignor to General Motors Corporation, Detroit, Mich., a corporation of Delaware Application December 12, 1955, Serial No. 552,409

11 Claims. (Cl. 74—625)

This invention pertains to fluid pressure operated actuators, and particularly to linear actuators having unidirectional locking means and manual overdrive means.

In some actuator installations it is only necessary to have releasable locking means for preventing actuator movement in one direction. The present invention relates to an actuator assembly including manually engageable, automatically releasable locking means for preventing actuator movement in one direction by the load. The instant actuator is designed for an installation wherein the load acts in one direction, for instance, a compression load. Moreover, upon failure of the fluid pressure system, the actuator can be manually moved in one direction, namely, in a direction opposed to the direction of the load, with the locking means engaged to prevent movement in the opposite direction. Accordingly, among my objects are the provision of an actuator assembly including unidirectional locking means; the further provision of an actuator assembly including manually engageable and automatically releasable unidirectional locking means; the further provision of a fluid pressure operated actuator including emergency manual means for effecting actuator movement in one direction; and the still further provision of a fluid pressure operated actuator including manually engageable load sensitive locking means for preventing actuator movement upon failure of the fluid pressure system.

The aforementioned and other objects are accomplished in the present invention by incorporating a rotatable and axially movable worm which carries a friction locking element capable of engaging a portion of the actuator cylinder to lock the actuator against movement in one direction due to the weight of the load, the worm being manually rotatable to move the actuator in the opposite direction with the locking means engaged. Specifically, the actuator includes a cylinder having a reciprocable piston disposed therein which divides the cylinder into an extend chamber and a retract chamber. The piston is operatively connected to a load which acts in a direction tending to retract the actuator, the load preventing rotation of the actuator piston. Similarly, the actuator cylinder is designed for attachment to a fixed support which prevents rotation of the cylinder. The actuator also includes a rotatable member, or screw shaft, bearing supported in the cylinder and operatively connected to the piston through a ball nut coupling whereby piston movement is dependent upon and effects rotation of the screw shaft. Hence, it is readily apparent that if rotation of the screw shaft is prevented in one direction, the actuator piston will be locked against movement in one direction.

To accomplish this result, the actuator includes unidirectional, load sensitive locking means. More particularly, the locking means comprises a thrust collar, or frictional element which is engageable with a shoulder in the actuator cylinder. The thrust collar is carried by a shaft having a reversible worm thereon which may be moved axially into and out of engagement with a reversible worm gear connected to rotate with the worm shaft. The worm shaft is thus supported for both rotation and axial movement relative to the cylinder, the worm shaft being located transversely in the cylinder relative to the screw shaft and having a part extending without the actuator cylinder. The part of the worm shaft extending without the actuator cylinder has formed therein a recess having internal splines which may be engaged by any suitable crank which can be inserted therein so that the worm shaft can be manually rotated.

It will be understood that when the worm gear engages the worm, both tangential and rotary forces are transmitted to the worm, which tend to both move the worm shaft axially and effect rotation thereof. In the disclosed embodiment, when the actuator piston moves in a direction opposed to that of the load, namely, when the actuator piston is extended, the worm shaft is moved axially out of engagement with the worm gear, and, hence, the thrust collar is automatically disengaged from the actuator cylinder to release the locking means. To engage the locking means, the worm shaft must be manually moved so that the worm engages the worm gear, whereupon the load connected to the actuator piston will move the actuator piston in a retract direction, thereby moving the thrust collar of the worm shaft into engagement with the cylinder, thereby engaging the locking means and preventing further movement of the piston under load. With the locking means engaged and the fluid pressure system inoperative, the actuator may be extended by inserting a crank in the worm shaft and rotating the worm shaft in a direction which effects outward movement of the piston. During emergency manual operation, the locking means will prevent retraction of the actuator piston under the weight of the load.

Further objects and advantages of the present invention will be apparent from the following description, reference being had to the accompanying drawings wherein a preferred embodiment of the present invention is clearly shown.

In the drawings:

Fig. 1 is a perspective view, partly in elevation and partly in section, depicting an actuator constructed according to this invention with the locking means engaged.

Fig. 2 is a view similar to Fig. 1 with the locking means released.

With particular reference to the drawings, an actuator is shown including a cylinder 10 having disposed therein a reciprocable piston 12 which divides the actuator cylinder into an extend chamber 14 and a retract chamber 16. One end of the cylinder 10 is closed by a head cap 18, which is connected thereto by a screw threaded coupling and the other end of the cylinder 10 is closed by a tail cap 20, which is, likewise, connected thereto by a screw threaded coupling.

The piston 12 includes sealing means 22 for engaging the inner periphery of the cylinder 10 and is formed with a hollow piston rod 24, which extends through the end cap 20. The free end of the piston rod 20 is designed for connection to a movable load, not shown, which acts in the direction of arrow 26, namely tending to retract the actuator. The compression load also prevents rotation of the piston 12 relative to the cylinder 10. The head cap 18 of the cylinder is adapted for connection to a fixed support, not shown, which likewise, prevents rotation of the cylinder 10. Thus, the piston 12 is capable only of reciprocation relative to the cylinder 10.

The actuator also includes a screw shaft, or rotatable member, 28 having a semi-cylindrical spiral groove 30, the screw shaft extending into the hollow piston rod 24. The piston 12 carries a nonrotatable nut 32 having a complementary semi-circular spiral groove, the nut being threadedly connected with the screw shaft by a plurality of circulating balls, not shown, which form a conventional ball-screw and nut coupling. The screw shaft 28 is journaled for rotation within the head cap 18 by a pair of ball bearing assemblies 34 and 36, the inner races of which 38 and 40 are retained in position between a worm gear 42 connected to rotate with the screw shaft 28 and a nut 44 threadedly connected with the screw shaft. The outer races 46 and 48, respectively, of the bearing assemblies 34 and 36 are retained in position between an inner shoulder 50 on the head cap and one end of the cylinder 10.

The reversible worm gear 42 is shown engaging a reversible worm 52 in Fig. 1 and disengaged from the reversible worm 52 in Fig. 2. The worm 52 is formed integral with a worm shaft 54, which is supported for rotation and axial movement in the head cap 18. The worm shaft 54 is formed with an integral thrust collar 56, constituting one of the locking elements, which is adapted to engage an internal shoulder 58 in the head cap 18, constituting the other locking element. Thus, the locking means of this invention are of the friction type. The other end of the worm shaft 54 extends outside of the actuator head cap 18 and has formed therein a recess 60 having internally splined teeth 62, which may be engaged by any suitable crank, not shown.

Since the piston 12 is operatively connected to the screw shaft 30 through a ball-nut coupling, it is readily apparent that movement of the piston 12 is dependent upon rotation of the screw shaft 28. Hence, if the screw shaft 28 is restrained against rotation in one direction, the piston 12 will be locked against movement in one direction. Since the load to which the instant actuator is subjected acts in the direction of arrow 26, namely in a direction tending to retract the actuator, the locking means are designed to prevent retraction of the actuator under this load. Movement of the actuator piston 12 to the right, or to a retracted position, effects clockwise rotation of the screw shaft 28, as viewed in Figs. 1 and 2. With the worm 52 engaged with the worm gear 42, clockwise rotation of the worm gear will impose both tangential and rotary forces on the worm shaft 54. Since the worm shaft is free to move axially, the tangential forces will move the worm shaft 54 to the right so that thrust collar 56 engages the shoulder 58. Accordingly, the load imposed upon the piston and transmitted through the screw shaft and worm gear 42 to the thrust collar 56 through the worm shaft 54 will cause the thrust collar 56 to bear against the shoulder 58 with a force proportional to the load and thereby prevent clockwise rotation of the screw shaft and movement of the piston 12 to the right. Under these circumstances the piston 12 can be moved to the left, or to an extended position, by manually inserting a crank in the recess 62 and turning the crank in a clockwise direction so as to effect counterclockwise rotation of the screw shaft which will cause the piston 12 to move to the left, as viewed in Fig. 1.

The end cap 20 of the actuator is formed with a port 64, while the head cap 18 is formed with a port 66. The port 64 communicates with the retract chamber 16, while the port 66 communicates with the extend chamber 14, it being understood that in an actuator installation, the ports 64 and 66 are connected by conduit means, not shown, to a valve, not shown, so that pressure fluid may be admitted to either the retract or extend chamber while the other chamber is connected to drain. With the locking means engaged, as shown in Fig. 1, the application of pressure fluid to the extend chamber 14 while the retract chamber 16 is connected to drain will automatically release the locking means since counterclockwise rotation of the screw shaft 28 and the worm gear 42 will move to the worm shaft 54 axially outward to disengage the thrust collar 56 from the shoulder 58, and also disengage the worm 52 from the worm gear 42.

In order to engage the locking means so as to prevent piston retraction under load, it is necessary to manually move the worm shaft 52 axialy inward to engage the worm 52 with the worm gear 42. Under these circumstances, if the pressure is relieved in the extend chamber 14, due to a failure in the fluid pressure system, the piston 12 will move to the right under the weight of the load taken in the direction of arrow 26, thereby effecting clockwise rotation of the screw shaft 28 and the worm gear 42 whereby the worm shaft 54 will be moved axially inward to engage the thrust collar 56 with the cylinder surface 58. Under these conditions, the actuator piston 12 cannot move to the right since rotation of the screw shaft 28 in the clockwise direction is restrained by frictional engagement between thrust collar 56 and the thrust surface 58.

*Operation*

When the fluid pressure system for operating the actuator aforedescribed is operative, the actuator piston 12 may be reciprocated relative to the cylinder 10 by applying pressure fluid to either the retract chamber 16 or the extend chamber 14 while the other chamber is connected to drain. If the fluid pressure system should fail when the actuator is extended, the load acting in the direction of arrow 26 will move the piston 12 to the right, thereby effecting clockwise rotation of the screw shaft 28. In order to prevent movement of the actuator piston in the retract direction under the weight of the load, it is only necessary to manually move the worm shaft 54 axially inward so that the worm 52 engages the worm gear 42. Thereafter, continued rotation of the screw shaft 28 in a clockwise direction caused by movement of the piston 12 towards a fully retracted position will cause the thrust collar 56 to frictionally engage the thrust surface 58, thereby locking the screw shaft 28 against rotation. Since movement of the piston 12 is dependent upon rotation of the screw shaft 28, the piston 12 will be locked against movement to a further retracted position by the locking means, which are load sensitive, i. e. the greater the load, the greater the restraining force.

With the fluid pressure system inoperative, the actuator piston 12 can be manually extended by inserting a crank, not shown, in the recess 60 of the worm shaft and rotating the worm shaft 54 in a clockwise direction which will effect counterclockwise rotation of the worm gear 42 and the screw shaft 28, thereby effecting movement of the piston 12 to the left. During manual extension of the piston 12, the locking means are engaged so as to prevent retraction of the piston 12.

When the fluid pressure system again becomes operative, the locking means will automatically be released upon application of pressure fluid to the extend chamber 14. This will occur since when the piston 12 moves outwardly due to pressure fluid in extend chamber 14, counterclockwise rotation of the screw shaft 28 and the worm gear 42 will effect outward axial movement of the worm shaft 54 so that the thrust collar 56 no longer engages the cylinder surface 58 and the worm 52 is disengaged from the worm gear 42.

From the foregoing, it is readily apparent that the present invention provides a unique actuator assembly which includes manually engageable, automatically releasable load sensitive locking means which prevent actuator movement in one direction under the influence of a load. In addition, the actuator may be manually moved in the opposite direction with the locking means engaged.

While the embodiment of the present invention as herein disclosed, constitutes a preferred form, it is to be understood that other forms might be adopted.

What is claimed is as follows:

1. A fluid pressure operated actuator including, a cylinder, a reciprocable piston disposed in the cylinder capable of fluid pressure actuation in both directions, a member rotatably supported in the cylinder and operatively connected to the piston such that piston movement effects and is dependent upon rotation of said member, a rotatable and axially movable element operatively engageable with said member, manual means for engaging said element and said member, and locking means cooperable between said element and said cylinder for locking the element and the member against rotation in one direction to thereby lock said piston against movement in one direction under a load acting in said one direction.

2. A fluid pressure operated actuator including, a cylinder, a reciprocable piston disposed in the cylinder capable of fluid pressure actuation in both directions, a member rotatably supported in the cylinder and operatively connected to the piston such that piston movement effects and is dependent upon rotation of said member, a rotatable and axially movable element operatively engageable with said member, manual means for engaging said element and said member, and locking means cooperable between said element and said cylinder for locking the element and the member against rotation in one direction to thereby lock said piston against movement in one direction under a load acting in said one direction, said locking means being automatically disengageable upon fluid pressure actuation of said piston in the opposite direction.

3. A fluid pressure operated actuator including, a cylinder, a reciprocable piston disposed in the cylinder capable of fluid pressure actuation in both directions, a member rotatably supported in the cylinder and operatively connected to the piston such that piston movement effects and is dependent upon rotation of said member, a rotatable and axially movable element operatively engageable with said member, manual means for engaging said element and said member, and locking means cooperable between said element and said cylinder for locking the element and the member against rotation in one direction to thereby lock said piston against movement in one direction under a load acting in said one direction, said manual means being capable of rotating said element with the locking means engaged so as to rotate said member and effect movement of said piston in the opposite direction.

4. A fluid pressure operated actuator including, a cylinder, a reciprocable piston disposed in the cylinder capable of fluid pressure actuation in both directions, a member rotatably supported in the cylinder and operatively connected to said piston whereby piston movement is dependent upon and effects rotation of said member, and unidirectional locking means operatively connected with said member for preventing rotation thereof, and, hence, preventing movement of said piston in one direction under a load acting in said one direction, said locking means comprising a rotatable and axially movable element engageable with said member and having a friction surface engageable with said cylinder.

5. A fluid pressure operated actuator including, a cylinder, a reciprocable piston disposed in the cylinder capable of fluid pressure actuation in both directions, a member rotatably supported in the cylinder and operatively connected to said piston whereby piston movement is dependent upon and effects rotation of said member, and manually engageable, unidirectional locking means operatively connected with said member for preventing rotation of said member, and, hence, preventing movement of said piston in one direction under a load acting in said one direction, said locking means being automatically released upon fluid pressure actuation of said piston in the opposite direction.

6. A fluid pressure operated actuator including, a cylinder, a reciprocable piston disposed in the cylinder capable of fluid pressure actuation in both directions, a member rotatably supported in the cylinder and operatively connected to said piston whereby piston movement is dependent upon and effects rotation of said member, manually engageable, unidirectional locking means operatively connected with said member for preventing rotation thereof, and, hence, preventing movement of said piston in one direction under a load acting in said one direction, and manually operable means for rotating said member with the locking means engaged to effect movement of said piston in the opposite direction.

7. An actuator assembly including, a cylinder, a piston reciprocable therein, a member rotatably journaled in the cylinder and operatively connected to the piston such that piston movement is dependent upon and effects rotation of said member, and manually engageable, unidirectional, load sensitive locking means operatively connected with said member for preventing rotation thereof in one direction so as to prevent movement of said piston in one direction under a load acting in said one direction.

8. An actuator assembly including, a cylinder, a piston reciprocable therein, a member rotatably journaled in the cylinder and operatively connected to the piston such that piston movement is dependent upon and effects rotation of said member, manually engageable, unidirectional, load sensitive locking means operatively connected with said member for preventing rotation thereof in one direction to prevent movement of said piston in one direction under a load acting in said one direction, and manually operable means operatively associated with said locking means for rotating said member to effect piston movement in the opposite direction with the locking means engaged.

9. An actuator assembly including, a cylinder, a piston reciprocable therein, a screw shaft rotatably journaled in the cylinder and operatively connected to the piston such that piston movement is dependent upon and effects rotation of said screw shaft, said screw shaft being restrained against axial movement relative to the cylinder, and manually engageable, unidirectional locking means operatively connected with said screw shaft for preventing rotation thereof to prevent movement of said piston in one direction under a load acting in said one direction.

10. Unidirectional, load sensitive locking means for an actuator having a cylinder, a reciprocable piston disposed in said cylinder capable of fluid pressure actuation in both directions and a member rotatably supported in said cylinder and operatively connected with said piston such that piston movement is dependent upon and effects rotation of said member, including, a rotatable and axially movable element engageable with said member such that when said element is engaged with said member rotation of said member in one direction will effect axial inward movement of said element and rotation of said member in the opposite direction will effect axial outward movement of said element, a thrust collar attached to said element, and a surface of said cylinder engageable with said thrust collar when the element is moved axially inward for preventing rotation of said element and said member to prevent movement of said piston in one direction under a load acting in said one direction.

11. A unidirectional, load sensitive locking means for an actuator having a cylinder, a reciprocable piston disposed in said cylinder capable of fluid pressure actuation in both directions and a member rotatably supported in said cylinder and operatively connected with said piston such that piston movement is dependent upon and effects rotation of said member, including, a worm gear connected to rotate with said member, a worm shaft engageable with said worm gear, said worm shaft being supported for rotation and axial movement relative to said cylinder, said worm shaft when engaged with said worm gear being moved axially inward upon rotation of said gear in one direction and axially outward upon rotation of said gear in the opposite direction, a thrust collar attached to said worm shaft, and a cooperating surface of said cylinder engageable with said thrust collar to prevent rotation of said worm shaft and said gear when said worm shaft is moved axially inward to thereby prevent movement of said piston in one direction under a load acting in said one direction.

References Cited in the file of this patent

UNITED STATES PATENTS

| | | |
|---|---|---|
| 1,046,145 | Budesheim | Dec. 3, 1912 |
| 2,688,227 | Geyer | Sept. 7, 1954 |
| 2,736,531 | Wilson | Feb. 28, 1956 |